(12) United States Patent
Hall et al.

(10) Patent No.: US 8,538,921 B2
(45) Date of Patent: Sep. 17, 2013

(54) FILE CACHING

(75) Inventors: David Hall, New York, NY (US); John Thrall, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1092 days.

(21) Appl. No.: 11/410,691

(22) Filed: Apr. 24, 2006

(65) Prior Publication Data

US 2007/0250513 A1 Oct. 25, 2007

(51) Int. Cl.
*G06F 7/00* (2006.01)

(52) U.S. Cl.
USPC .......................................... 707/627; 707/636

(58) Field of Classification Search
USPC .......................................... 707/204, 1, 3, 627
See application file for complete search history.

(56) References Cited

U.S. PATENT DOCUMENTS

| | | | |
|---|---|---|---|
| 6,243,760 B1 * | 6/2001 | Armbruster et al. .......... | 709/243 |
| 6,542,933 B1 | 4/2003 | Durst, Jr. et al. | |
| 6,553,376 B1 * | 4/2003 | Lewis et al. ..................... | 707/10 |
| 6,745,368 B1 | 6/2004 | Boucher et al. | |
| 6,941,338 B1 * | 9/2005 | Madsen ......................... | 709/203 |
| 6,957,247 B1 * | 10/2005 | Ates ............................... | 709/203 |
| 7,024,452 B1 * | 4/2006 | O'Connell et al. ............ | 709/203 |
| 7,076,560 B1 * | 7/2006 | Lango et al. .................. | 709/231 |
| 7,080,158 B1 * | 7/2006 | Squire ........................... | 709/245 |
| 7,136,932 B1 | 11/2006 | Schneider | |
| 7,571,217 B1 * | 8/2009 | Saxena .......................... | 709/217 |
| 2001/0044824 A1 | 11/2001 | Hunter et al. | |
| 2002/0049832 A1 | 4/2002 | Ulman et al. | |
| 2002/0073084 A1 * | 6/2002 | Kauffman et al. .............. | 707/10 |
| 2003/0097564 A1 * | 5/2003 | Tewari et al. .................. | 713/171 |
| 2004/0010562 A1 * | 1/2004 | Itonaga ......................... | 709/213 |
| 2004/0267702 A1 * | 12/2004 | Gallant et al. ................... | 707/2 |
| 2009/0059936 A1 * | 3/2009 | Van De Poel et al. ......... | 370/401 |
| 2009/0132640 A1 * | 5/2009 | Verma et al. .................. | 709/203 |

OTHER PUBLICATIONS

Notification of Transmittal of the International Search Report and the Written Opinion of the International Searching Authority, or The Declaration (PCT/US2007/006785).

* cited by examiner

*Primary Examiner* — Amy Ng
(74) *Attorney, Agent, or Firm* — James J. DeCarlo; Greenberg Traurig, LLP

(57) ABSTRACT

A system and method for publishing a file on a network is. A caching service reduces the load on the publisher's server by publishing that the file is at a fictitious network location. Requests directed to the fictitious location are received by the caching service and the fictitious network location is parsed to determine what file is being requested. If the caching service already has a copy of the file, then the copy is transmitted to the requestor without alerting to the requester that the address is fictitious. If the caching service does not have a copy of the file, then a copy is automatically obtained based on information contained in the fictitious network location.

16 Claims, 4 Drawing Sheets

FILE CACHING

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Media files accessible over a network are increasingly being used to deliver content to mass audiences. However, serving media on the Internet can often become an expensive proposition for individuals. Authors create and post media on the Internet in the hopes that others will find it interesting, yet if too many people find their content interesting, it will lead to bandwidth limits being reached, or even worse, a large bill from their web host.

A perfect example of this can be found in the rapidly growing world of video web logs or "vlogs." A vlog is similar to a web log (a "blog") except that video media is the primary content of the log. Thus, the bandwidth requirements for vlogs is significantly greater than that of blogs and even audio-only media. At Vloggercon 2004, one common complaint of vloggers was that, as their audience grew, so did their bills. Some had become so popular, they were facing the difficult decision of having to shut their site down completely.

SUMMARY OF THE INVENTION

Various embodiments of the present invention relate to a system and method for publishing a file on a network using a caching service to reduce the load on the publisher's server by publishing that the file is at a fictitious network location. Requests directed to the fictitious location are received by the caching service and the fictitious network location is parsed to determine what file is being requested. If the caching service already has a copy of the file, then the copy is transmitted to the requestor without alerting to the requestor that the address is fictitious. If the caching service does not have a copy of the file, then a copy is automatically obtained based on information contained in the fictitious network location.

In one aspect the invention may be considered a method for reducing requests for a file on a server. The method includes providing the file on the server so that the file has a location on a network from which it may be accessed. A hyperlink is published in which the hyperlink includes a caching system identifier and a file identifier. The file identifier identifies the location on the network to the caching system. Subsequent user selection of the hyperlink generates a first request addressed to the caching system identified by the caching system identifier.

In another aspect the invention may be considered a method of automatically caching a file. The method includes receiving, by a caching service at a second network location, a request from a requestor for a file at a first network location. The request is addressed to the caching service at the second network location which is remote from the first network location. The request is processed to determine the first network location and a cache accessible to the caching service is then searched for a copy of the file previously obtained from the first network location.

In another aspect the invention may be considered a memory for storing data for access by an application program being executed on a computing device. The memory includes a data structure, such as a web page, stored in said memory. The data structure includes at least one hyperlink associated with a file at a first network location. The hyperlink is interpretable by a client computing device to generate a request for file addressed to a cache server computing device at a second network location.

In another aspect the invention may be considered a method of publishing a file on a network. The method includes making the file accessible on the network at a first location on a publisher's computer and publishing to client computing devices that the file is located at a second location on the network. The second location is a fictitious location on a third party computing device that does not contain a copy of the file.

Additional features of the invention will be set forth in the description which follows, and in part will be apparent from the description, or may be learned by practice of the invention. The various features of the invention will be realized and attained by the structure particularly pointed out in the written description and claims hereof as well as the appended drawings. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of at least one embodiment of the invention.

In the drawings.

DETAILED DESCRIPTION

Reference will now be made in detail to illustrative embodiments of the present invention, examples of which are shown in the accompanying drawings.

At a high level, an embodiment of the present invention may be considered systems and methods for publishing a file on a network using a caching service to reduce the load on the publisher's server by publishing that the file is at a fictitious network location. Requests directed to the fictitious location are received by the caching service and the fictitious network location is parsed to determine what file is being requested. If the caching service already has a copy of the file, then the copy is transmitted to the requestor without alerting to the requestor that the address is fictitious. If the caching service does not have a copy of the file, then a copy is automatically obtained based on information contained in the fictitious network location.

This system allows a publisher to, in effect, automatically cache a file with a caching service by directing requests to the fictitious network location without having to previously provide the file to the caching service. In addition, it allows the publisher to move the load of all subsequent requests after the initial caching service requests to the caching service.

Figure 1:
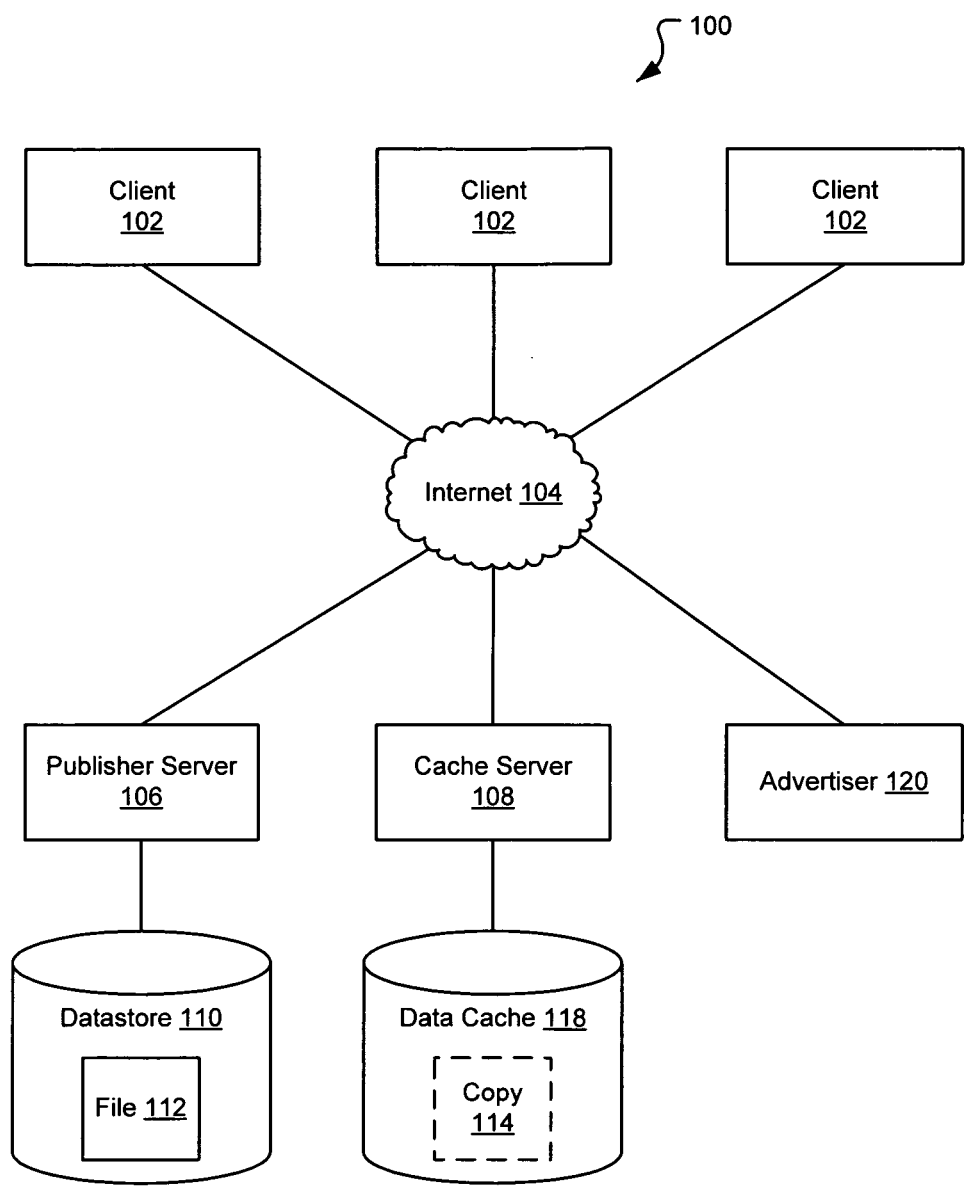
FIG. 1 is a high-level illustration of an embodiment of an architecture suitable for practicing embodiments of the present invention.

FIG. 1 is a high-level illustration of an architecture suitable for practicing embodiments of the present invention. In the embodiment shown, the architecture 100 includes a number of client computing devices 102 (sometimes alternatively referred to simply as "clients" or "a client") that are adapted to communicate with a network 104, such as the Internet. Three client computing devices 102 are shown for the purposes of this example, however, one skilled in the art will recognize that any number of clients 102 may be supported by the systems and methods described herein. Examples of computing devices include personal computers (PC), web enabled cellular telephones, personal digital assistants (PDA) or the like, coupled to the network 104 by any one of a number of known manners. Furthermore, a client computing device 102 may include an Internet browser (not shown), such as that offered by Microsoft Corporation under the trade name INTERNET EXPLORER, or that offered by Netscape Corp. under the trade name NETSCAPE NAVIGATOR, or the software or hardware equivalent of the aforementioned components that enable networked intercommunication between users and service providers and/or among users.

The architecture 100 also includes at least one publisher server 106. The publisher server 106 is a computing device from which clients may obtain files, such as file 112. Such computing devices are commonly referred to as servers because they serve client requests. Client-server systems are well known in the art and any suitable computing device may be used, such as those described above. In addition, computing devices specifically adapted to supporting numerous network requests, such as purpose-built servers or PC's using server software, may be used.

The publisher server 106 is the computing device for which the load is wished to be limited by reducing the number of client requests for the file 112. The publisher server 106 includes at least one file 112, such as a media file containing video although any file containing any type of data may be used, for which the publisher expects one or more clients 102 to request. In addition, the publisher server 106 may include one or more web pages (not shown) that include hyperlinks (not shown and discussed below) provided to allow a client to access the file 112.

The file 112 may be stored on a mass storage device 110 that is connected to the publisher server 106 or alternatively may be considered part of the publisher server 106. The mass storage device 110 and its associated computer-readable media, provide non-volatile storage. Although the description of computer-readable media contained herein refers to a mass storage device, such as a hard disk or CD-ROM drive, it should be appreciated by those skilled in the art that computer-readable media can be any available media that can be accessed by the publisher server 106.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

The file 112 is accessible on the network 104, e.g., on the publisher server 106, through the use of a network address. If a client is aware of the network address for the file 112, the client may issue requests directly to publisher server 106 to the network address for the file 112 at that address. The request is routed through the network 104 to computing device, in this case the publisher server 106, associated with the address.

An example of a network address is a Uniform Resource Locator (URL). An URL is a string of characters conforming to a standardized format, which refers to a resource on the Internet (such as a document, a video, or an image file) by its location. For example, the URL of a web page on Wikipedia is http://en.wikipedia.org/wiki/URL. An HTTP URL, commonly called a web address, is usually shown in the address bar of web browser. Every URL is a type of Uniform Resource Identifier (URI), or, more precisely, the set of URLs is a proper subset of the set of URIs. A URI identifies a particular resource while a URL both identifies a resource and indicates how to locate it, so that a request may be made for it.

URLs typically conform to a scheme. In one common scheme, the URL may considered to contain two components, a host portion and a path portion. The host portion usually identifies a specific server computer, or network of server computers, to the network. The host portion may contain a network address (such as an IP address) or may contain a abstract identifier, such as a domain name, that is associated with the specific server computer via an accessible directory.

The path portion identifies to the server computer where to find the requested file or resource. In one common URL scheme, the path portion contains a specification of a location in some hierarchical file structure of the server computer, using a slash ("/") as delimiter between components.

Files at a network location, such as files on the publisher server 106 via the network, may be accessed if the client computer knows files the location. For some files such locations may be found via search engines, if the content of the file can be searched and indexed. While this is a simple matter for .HTML files, many media files can not yet be searched in that the content of the media file can not be determined through inspection by a searching computer. Thus, files for which the network location is unknown or cannot be found by a client 102 are effectively inaccessible to clients 102 on the network 104.

In order to make the network location of the file 112 known to potential clients 102, publishers commonly provide the network location of a file 112 in a hyperlink in web page, often a web page discussing content of the file 112. A hyperlink, also referred to simply as a "link," is a reference in a document, such as a hypertext web page, to another document or other resource at a network location. Combined with a data network and suitable access protocol, a computer can be instructed to fetch the resource referenced by the hyperlink. Hyperlinks are part of the foundation of the World Wide Web. There are a number of ways to format and present hyperlinks on a web page. An embedded link is one of the more common formats: one or more words of distinctively styled text that when selected, such as by a pointing device like a mouse, causes a computer to issue a request addressed to the network location of the hyperlink for the referenced document.

In practice, publishers effectively make a file 112 accessible by publishing a document containing a hyperlink with the network location of the file 112. As such, publishing the file 112 may be considered to include storing the file 112 in an accessible network location and then publishing or otherwise providing clients 102 with the address of the file's network location.

In embodiments of the present invention, a publisher publisizes that the file 112 is not located at the publisher server 106, but rather at a cache server 108 remote from the publisher server 106. The publisher does this by providing hyperlinks that instead of containing the network location of the file 112, contain a fictitious network location that, when utilized by a client 102 to generate a request for the file 112, causes requests to be addressed and routed directly to the cache server 108. The cache server 108 includes data cache 118, which is a data store or other mass storage device. Upon receipt of the request so addressed, the cache server 108 searches the data cache 118 for a copy 114 of the file 112. If there is no copy 114 in the cache 118, then the cache server 108 issues a request directly to the network location of the file 112. If there is a copy 114 in the data cache 118, then the cache server 108 serves the copy 114 to the requesting client 102. As discussed in greater detail below, the cache server 108 may also include additional content with the copy 114 to the client 102, such as an advertisement provided by a advertiser 120.

Figure 2:
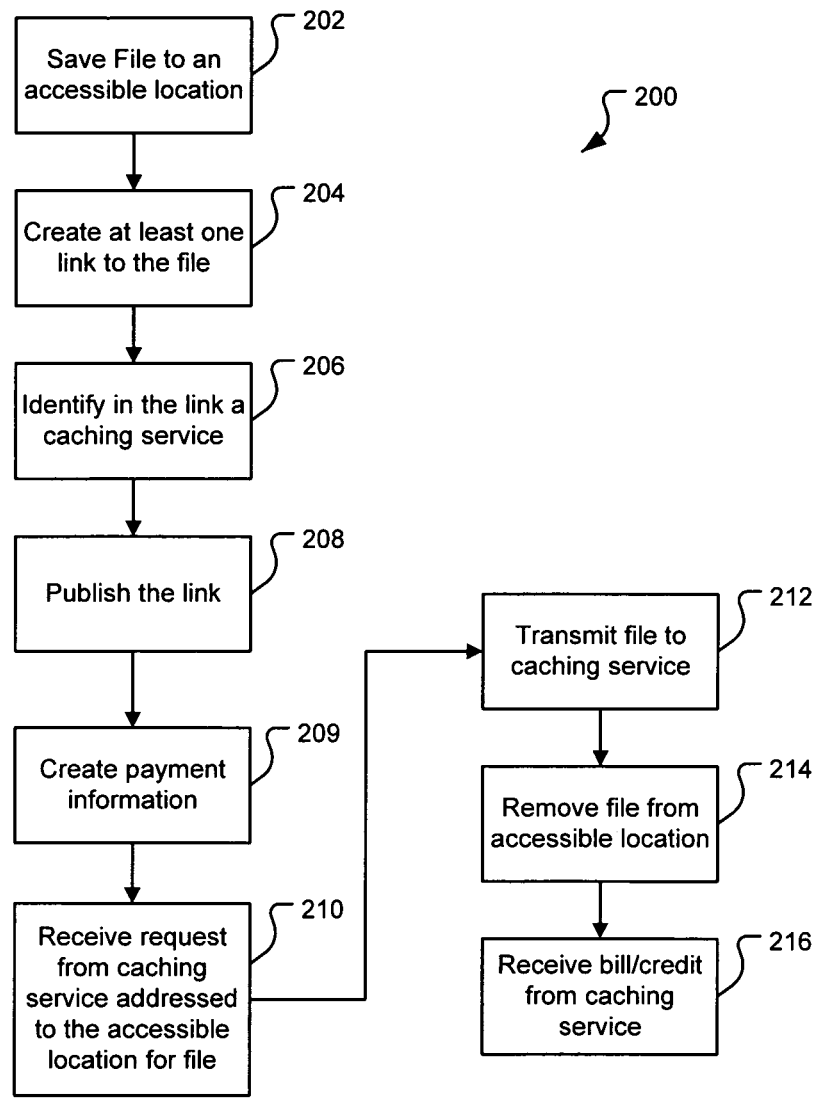
FIG. 2 is a flowchart of an embodiment of a method performed by the publisher to utilize a caching service reduce requests for a file on the publisher server.

FIG. 2 is a flowchart of an embodiment of a method performed by the publisher to utilize a caching service reduce requests for a file on the publisher server. In the embodiment shown, the method 200 includes a file posting operation 202 in which the file is stored or otherwise made accessible at a network location so that a computing device on the network could retrieve the file if the device had knowledge of the network location. The posting operation 202 could include saving a file into an accessible file structure. The posting operation 202 could also include changing access restrictions on the publisher server to permit access to the file to remote clients. In an embodiment, posting operation 202 may include making the file accessible to any computing device with knowledge of the address. In an alternative embodiment, posting operation 202 may include making the file accessible to only specific computing devices, such as the cache server.

The method 200 also includes publisher creating at least one document or other source of information that provides or otherwise publicizes a network location (referred to as the "published location" in order to different it from the actual network location) for the file posted on the network in posting operation 202.

The publisher does this by creating, in a create reference operation 204, one or more documents or other sources of information to clients that indicates that the file may be obtained at the published location. For example, the publisher may create a searchable web page describing the file to clients and which contains a hyperlink to the file. The publisher then knows that, when the web page is "published" or otherwise made available for searching by third party search engines, clients will be able to find the web page and through the hyperlink request copies of the file. In the example, the published location may be provided as part of at least one hyperlink in a document searchable by a search engine.

The published location, however, is to a fictitious network location that is different from the actual network location of the file. In an identify caching service operation 206, the publisher creates a fictitious network location for use as the published location. The fictitious network location includes information identifying the caching service, in an identify caching service operation 206. Requests directed to the fictitious location are not directed to the publisher server and, in fact, are directed to the caching service for processing, as will be discussed in greater detail below.

For example, in an embodiment a web page is created in the create reference operation 204 by a publisher indicating to a client that the file may be obtained from the hyperlink. In the identify caching service operation 206, the publisher then creates the fictitious network location and identifies that location as the address of the file.

The published location includes information identifying the caching service and also identifying the file, at least to the caching service. For example, in an embodiment, to cause requests for the file to be directed to the caching service the publisher the fictitious network location includes a prefix such as "http://cache.yahoo.com" that, when used as the first portion of an address for a request, causes the request to be transmitted directly to a computing device operated by the caching service. The publisher effectively enables and implicitly requests the caching service to cache the file by using the caching service's network address, in this case the caching service's domain name, as the prefix of the published location for the file.

The publisher also identifies the file to cached to the caching service and includes this information in the published location. In an embodiment, this can be done by providing the network address of the file after the prefix of the in the published location. Using the example discussed above, if the file is actually located at "http://zorin.org/share/kitten-music-video.wmv" which is a URL for the file on the publisher server, the publication location may be "http://cache.yahoo.com/http://zorin.org/share/kitten-music-video.wmv." The publication location is then a URL for the fictitious network location http://cache.yahoo.com/http://zorin.org/share/kitten-music-video.wmv and requests directed to the published location are received by the caching service. The caching service then uses the file identifier "http://zorin.org/share/kitten-music-video.wmv" (which is a URL for the file on the publisher server) to determine what file is being requested and either transmit the file back to the requestor or obtain the file for storage in the cache, as will be described in greater detail below.

In a graphical user interface, the usage of a mouse cursor may also change into a hand motif to indicate a link. In most graphical web browsers, links are displayed in underlined blue text when not cached, but underlined purple text when cached. When the user activates the link (e.g. by clicking on it with the mouse) the browser will display the target of the link. If the target is not a HTML file, depending on the file type and on the browser and its plugins, another program may be activated to open the file. In HTML, code for hyperlink often is indicated by the HTML element "a" with the attribute "href" and optionally also the attributes "title", "target", and "class" or "id": <a href="URL" title="link title" target=" link target" class="link class">link label</a>. For the example provided above, an embedded link to the caching service in a web page, blogpost, or comment may take this form when viewed as a HTML source code: <a href="http://cache.yahoo.com/http://zorin.org/share/kitten-music-video.wmv">kitten-music-video</a>. This source code is interpreted by a browser, upon selection by a user, to generate a request to the URL http://cache.yahoo.com/http./zorin.org/share/kitten-music-video.wmv.

In the example provided above, for a publisher to enable caching of the publisher's file, the publisher need only add a prefix to the known URL of the file on the publisher's server. If the publisher is aware of the prefix, the publisher need not interact with caching service before initiating caching.

After the published location has been created in the identify caching service operation 206, the publisher then publishes in a link publication operation 208 the document on the network, thereby making the published location known to clients as the network location of the file.

As discussed in greater detail below, in response to the first client request directed to the caching service for the file, the caching service will determine it does not have the file in its cache and will issue a subsequent request, based on the information contained in the address of the client request, to the publisher server for the file. The subsequent request is received by the publisher server in a receive request operation 210. In an embodiment, the requests as discussed above may be well-known HTTP GET requests, FTP file transfer requests or any combination of the same. The generation, transmission and receipt of electronic requests for files are well known in the art and need not be described herein. The methods and systems described herein may be adapted to use suitable method for retrieving files from remote computer now known or later invented.

The publisher responds to the subsequent request from the caching service by transmitting a copy of the file to the caching service in a transmission operation 212. In an embodiment, this may be the only file served by the publisher server, all subsequent requests being handled by the caching service. In an alternative embodiment, the publisher server may also service requests directly to the publisher service for the file from clients with knowledge of the actual network location, for example if that location is also generally known or known only to select clients.

The method 200 may also include removing the network in a remove operation 214 after the caching system has obtained a copy. In an embodiment, this allows the publisher to require that all future requests be handled by the caching system, thereby relieving the publisher server from the need to use resources in maintaining the file on the network and even from the need of being on the network at all.

The method 200 may further include a billing operation 216. The term billing as used herein should be considered in its broadest sense as an accounting between parties for services rendered and, thus, may include charging/debiting or paying/crediting a party money or some other good or service. For example, depending on the business model of the caching service, billing operation 216 may include receiving a monthly or periodic bill from the caching service for providing the caching service. Like a hosting service, the caching service may charge the publisher on a per download basis, a size of cached basis, a fixed fee basis or some other basis such as mutually negotiated or provided contact term. Alternatively, if the caching service derives profit from providing advertising or other services associated with caching the file, the caching service may compensate the publisher with some credit or payment. Such compensation may be based on the number of requests received by the caching service for the file, the number of advertisements transmitted to requestors of the file at the first network location by the caching service, the number of "click-throughs" on advertisements transmitted with the file, or some other mutually negotiated or provided terms.

The method 200 can be used by a publisher as a simple means of syndicating the publisher's content. In an embodiment, a publisher may create an account with the caching service by logging into the caching service and providing information in a create publisher account operation (not shown). If a publisher has already created an account, this information may be included within the published location of the file as an additional element.

In an alternative embodiment, a caching service may automatically create an account for each file, publisher, or domain name upon the first occurrence of a request. As discussed below, the caching service may search the publisher's server for payment information automatically as part of the caching process. In an embodiment, to take advantage of the automatic payment system, the publisher creates and stores payment information on the publisher's server in a pre-determined format identifiable by the caching service in a create payment information operation 209. The format may dictate what form the payment information takes and where the payment information is located so that the caching service can find it. This payment information is then used by the caching service to automatically generate bills or payments as described below.

The method 200 is a simple way for a publisher to automatically cache files and reduce the number of requests for files directed to the publisher server. In addition, except for the request from the caching service for the file, the publisher need not serve any other request from any client for the file. In addition, to the extent that the publisher only identifies the file as being located at the published location, no client may ever request the file from the publisher server as no client will have knowledge of the network location of the file on the publisher server. The method 200 also allows the publisher to access other services, such as the automatic addition of advertisements to the publisher's file, provided by the cache service and potentially receive associated compensation.

Figure 3:
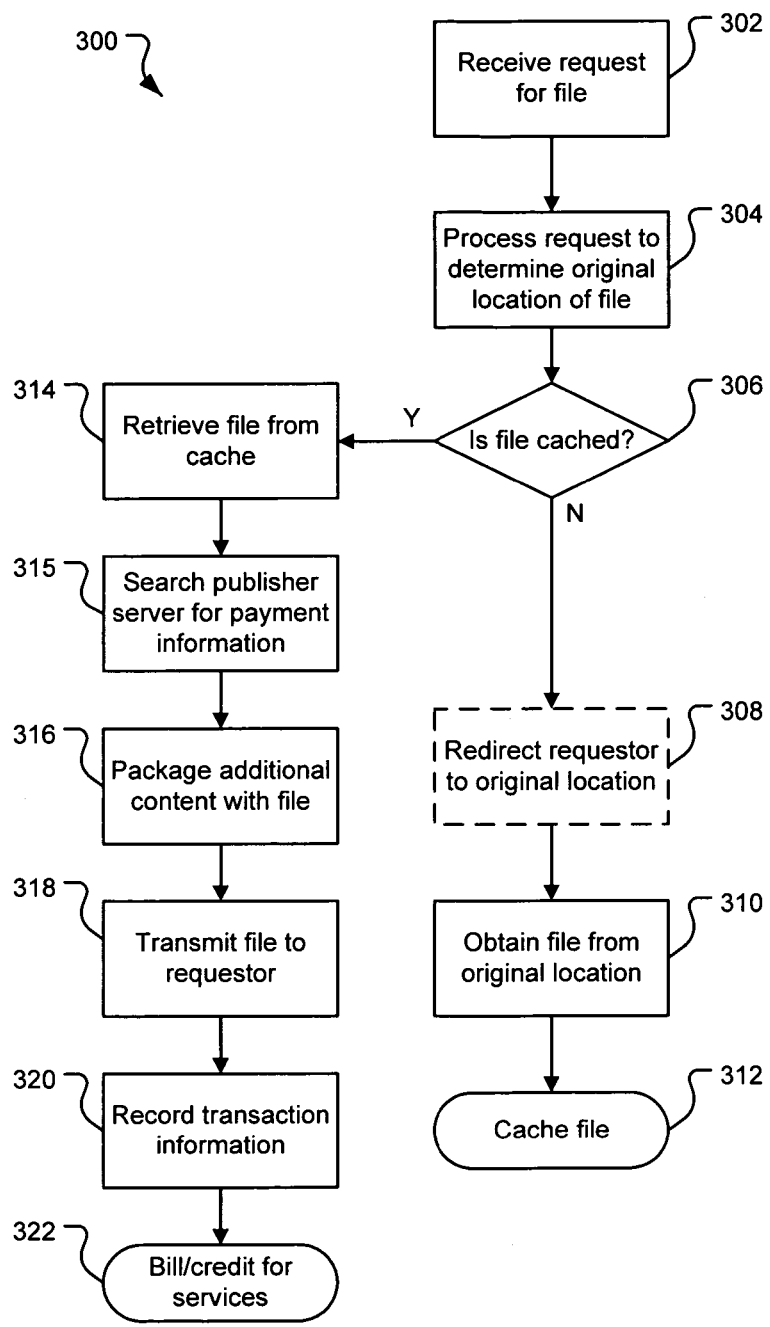
FIG. 3 illustrates a flowchart of an embodiment of a method for automatically caching a file.

FIG. 3 illustrates a flowchart of an embodiment of a method for automatically caching a file. In the embodiment shown, the method 300 may be performed by a caching service that a publisher of a file has identified in a published location as described above with reference to FIGS. 1 and 2. The method begins with the receipt by the caching service of a request from a client for a file in a receive request operation 302. The request is addressed directly to the caching service through the published location. In an embodiment, the request is generated when the user of the client computing device selects a hyperlink that contains a URL that includes an identifier of the caching service and the file to be cached. Such a hyperlink may have been created by the publisher of the file and then published on the network.

After receipt of the request, a processing operation 304 processes the request in order to identify what file is being requested by the client. The processing operation 304 may include parsing the address to which the request was sent to extract some file identifier. For example, in an embodiment, the URL to which the request was sent may contain a prefix or host portion that includes information identifying the caching service and that caused the request to be transmitted to the caching service. Another portion of the request, such as a path portion may include some or all of the file's name or actual location on the network. In the example provided with reference to FIG. 2, for instance, the http://cache.yahoo.com/ of the URL http://cache.yahoo.com/http://zorin.org/share/kitten-music-video.wmv may be discarded, leaving the remainder of the URL http://zorin.org/share/kitten-music-video.wmv to be used as the file identifier. In an alternative embodiment, file identifiers that interpretable only by the caching server may be used, such as a hash of the file's URL or a subportion of the URL prefaced by a publisher's ID. Regardless of the nature of the file identifier, the processing operation 304 allows the caching service to identify both a copy of the file within the cache, if any, and the file's actual network location if there is no copy in the cache.

After identifying the file based on the information in the request, the caching service searches the cache for a file associated with the file identifier in a search operation 306. In an embodiment, each file in the cache is associated with one or more file identifiers that are contained in the requests received. For example, in an embodiment each file in the cache is associated with the original URL from which the file was originally obtained. In an alternative embodiment, each file may be associated with one or more URLs, so that identical files originally available from a multiplicity of network locations may be more efficiently stored.

In the method 300, initially the file will not be known to the caching service and the search operation 304 will not find the file. If the search operation does not find a file associated, then the file is retrieved from its location on the network in a obtain file operation 310. In an embodiment obtain file operation 310 includes generating a request addressed to the file identifier in the URL of the request received in the receive operation 302. In an alternative embodiment, the obtain file operation 310 includes generating a request addressed to the network location of the that is determined by the processing operation 304.

After the file (or more precisely a copy of the file) has been obtained from the file's network location, the file is then cached in a cache operation 312. The file is stored in the caching service's cache so that it will be associated with any future requests for the file directed to the caching service.

The cache operation 312 may include additional actions in which the file is further processed. Such additional processing may include modifying the file to make it more suitable for serving by the caching system. Processing may also include categorizing the file based on some information such as the expected download demographic, the file type or content of the file. Such information may be provided by the publisher explicitly or in metadata contained in the file itself In addition, this information may be periodically updated based on new information later received directly from the publisher, advertiser or clients.

Figure 4:
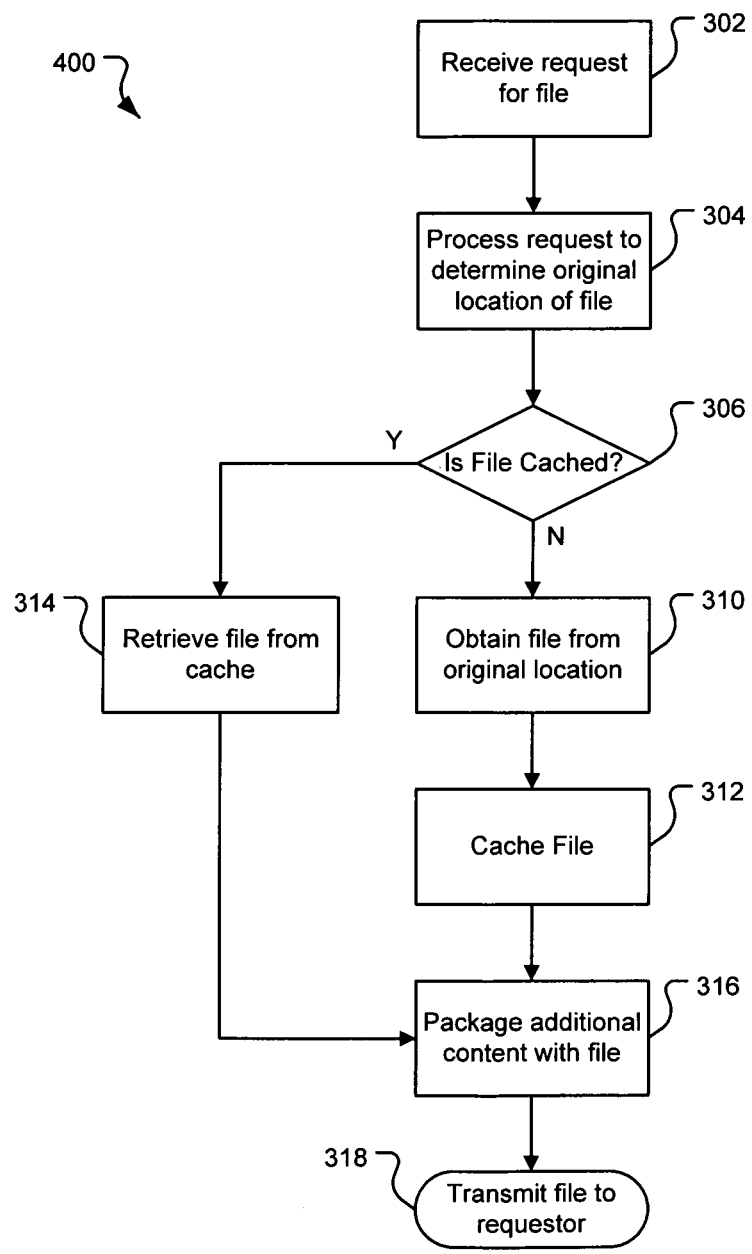
FIG. 4 illustrates a flowchart of an alternative embodiment of a method for automatically caching a file.

In addition, if the file is not known to the caching service, the client may be redirected to the actual location of the file in a redirection operation 308 or, alternatively, the file may be transmitted to the client after the file is obtained (see FIG. 4). In the redirection operation 308 a response may be generated and transmitted to the client identifying to the client the file's actual network location, which the client was previously unaware of. The redirection operation 308 is optional (as illustrated by the dashed lines), as the file could be transmitted to the client after it has been obtained in the obtain file operation 310. However, redirection of the initial client request may cause the client request to be fulfilled faster than if the file was transmitted from the caching service. In addition, in current communication protocols such redirection is easily facilitated. If the redirection operation 308 is utilized, it should be noted that the publisher server may be concurrently responding to both the client request and the caching service request.

If the search operation 306 determines that there is a copy of the file already in the cache, then the caching system retrieves the file from the cache in a retrieve operation 314. In an embodiment, this may include automatically generating and transmitting an HTTP, FTP or other request for the file. In another embodiment, any means for retrieving a file may be used to obtain a copy of the file.

The caching service may also automatically search the publisher's server for payment information, such as in the search for payment information operation 315 as shown. In an embodiment, the caching service may inspect the publisher's server for payment or account information matching a pre-determined format. For example, the caching service may look for files with a specific name, such as "payment.txt", in a specified folder or, in a certain location relative to the original file's location. If information matching the pre-determined format is located, then payments are automatically made to the publisher as part of the bill operation 322 discussed below using that information.

The retrieved file may then be packaged with additional content, such as advertisements, in a package file operation 316. The package file operation 316 may include adding additional content directly to the file thereby creating a new file, may include transmitting additional content in the response with the file, or may include selecting and transmitting content in a completely separate response to the requestor that issued the request received in receive operation 302. For example, for a standard video media file type, a video advertisement may be packaged within the file by prepending the advertisement in front of the original content of the file. For unknown file types, popup advertisements may be selected.

After the packaging operation 316, the response or responses to the client request are transmitted to the requestor in a transmit cached file operation 318.

Information related to the transaction is stored in a record transaction information operation 320. Any information associated with the transaction may be recorded for later use in generating a bill for services or evaluating the operation of the cachin service. This may include recording the identity or demographics of the requestor, recording the file requested, and/or recording the advertisement or other content provided with the file.

In addition, information may be recorded in a publisher account associated with the file requested. In an embodiment, a publisher account may be automatically created upon the first occurrence of a request. Alternatively, a publisher may actively create an account by accessing the caching service. An automatically created account may identify the publisher by the domain name of the file's actual location, a separate account for each file location, or by some other information derived from the file's address or the request. For example, this information may be included within the published location of the file as an additional element. In an embodiment, publisher accounts may be associated with a file location, a publisher, a domain name or a publishing server.

Periodically or occasionally, then, the caching service may generate a bill for services rendered to the various parties in a bill operation 322. Again, bill operation 322 need not require that a monetary bill be generated, only that some accounting be performed and the various parties, i.e., the publisher, content providers and the advertisers, be alerted that services were performed. However, depending on the business model of the caching service, bill operation 322 may include generating a debit or credit to one or more of the parties.

For example, in an embodiment, if a publisher wishes to be paid for syndicating media, the publisher would create a file on the publisher's server, for example called "payment.txt," that only has one line in it; an email address. In the search operation 315, the caching service searches for files matching the format, in this case text files named "payment.txt". The caching service then tracks the amount of money that has been generated from this publisher and after it reaches a certain threshold, a payment is automatically sent as part of the bill operation 322 discussed below to that email address, by an email payment service such as PayPal. Alternatively, a check may be automatically generated and mailed to an identified address/addressee of the publisher or an identified bank account may be credited or billed.

FIG. 4 illustrates a flowchart of an alternative embodiment of a method for automatically caching a file. In the embodiment of the method 400 shown, many of the operations are substantially the same and therefore include the same reference numbers as those discussed above with reference to FIG. 3. One difference between the method 400 and the method 300 is that the client that generates the first request to the caching service for a file is not redirected to the file's network location. Instead, the file is retrieved and subsequently treated in the same manner as if the file was in the cache at the time the request was received.

Note that in the methods described above, a publisher using the caching service may expressly initiate the caching of the file by attempting to access the published location as soon as the file is located on the publisher server. This allows the publisher to verify that the caching system is operable and at the same time cause the caching service to obtain a copy of the file.

In the embodiments described above, the end user (i.e., the client) may be kept oblivious to what is occurring behind the scenes. The end user's desire is to view the media and under normal circumstances the end user does not necessarily care where the file is actually coming from. The embodiments described herein solve this by quickly redirecting to the appropriate location without any need for end user interaction.

In an embodiment, the caching service may utilize additional bandwidth saving or file conversion services. Such additional services would be provided by the caching service automatically relieving the publisher or publisher server operator from the need to engage those services directly. For example, in response to a request for a cached file, the client requester may be delivered a web page showing several choices for obtaining the file, each choice reflecting an additional service provided by the caching service beyond merely caching the file. Each choice may be accessed through a separate hyperlink, each resulting a different copy of the file to be transmitted to the client. The choices may include identifying several mirror sites operated by the cache service allowing the client to select the most appropriate mirror, identifying different file types allowing the client to select a different file type that what was originally provided by the publisher (for this the cache service may automatically create and store or convert on the fly the different file types from the original file), or identify different compressed forms of the file to further reduce the download time to the client:

One example of such an additional service is the BitTorrent system. BitTorrent is both the name of a peer-to-peer (P2P) file distribution client application and also the name of the file sharing protocol itself. BitTorrent is designed to widely distribute large amounts of data without incurring the corresponding consumption in costly server and bandwidth resources. According to CacheLogic, BitTorrent traffic accounts for ~35% of all traffic on the internet.

The BitTorrent protocol breaks the file(s) down into smaller fragments, typically a quarter of a megabyte (256 KB) in size. Peers download missing fragments from each other and upload those that they already have to peers that request them. The protocol is 'smart' enough to choose the peer with the best network connections for the fragments that it's requesting. To increase the overall efficiency of the swarm (the ad-hoc P2P network temporarily created to distribute a particular file), the bittorrent clients request from their peers the fragments that are most rare; in other words, the fragments that are available on the least number of peers, making most fragments available widely across many machines and avoiding bottlenecks. The file fragments are not usually downloaded in sequential order and need to be reassembled by the receiving machine. It is important to note that clients start uploading fragments to their peers before the entire file is downloaded. Sharing by each peer therefore begins when the first complete segment is downloaded and can begin to be uploaded if another peer requests it. This scheme is particularly useful for trading large files such as videos and operating systems. This is different from conventional file serving where high demand can lead to saturation of the host's resources as the consumption of bandwidth to transfer the file to many requesting downloaders surges. With BitTorrent, high demand can actually increase throughput as more bandwidth and additional "seeds" of the file become available to the group. Cohen claims that for very popular files, BitTorrent can support about a thousand times as many downloads as HTTP.

One drawback of BitTorrent is that it requires actions on the part of the server operator to use the BitTorrent system. The caching service could provide BitTorrent as an additional service for some or all file requests; thus further increasing the speed of file download clients of the cached file.

While the invention has been described in detail and with reference to specific embodiments thereof, it will be apparent to those skilled in the art that various changes and modifications can be made therein without departing from the spirit and scope thereof. For example, the caching service may periodically check the age of the files in the cache and, if a cached file is older than some threshold age, attempt to obtain a fresher copy of the file or check to determine if the file on the publisher server is different (i.e., it has been changed or updated by the publisher since the cached copy was obtained) from the cached copy. Thus, it is intended that the present invention cover the modifications and variations of this invention provided they come within the scope of the appended claims and their equivalents.

What is claimed is:

1. A method comprising:
receiving, by a caching service at a second network location, a request from a requestor for a file at a first network location, the request addressed to the caching service, the request comprising a host portion comprising an identifier and a path portion specifying a file structure corresponding to the identifier for locating the file at the first network location, the second network location is remote from the first network location, the second network location is a fictitious location on a third party computing device;
processing the request to determine the first network location; and
after the processing step, parsing a cache accessible to the caching service for a copy of the file corresponding to the host portion and path portion previously obtained from the first network location.

2. The method of claim 1 wherein processing further comprises:
parsing the request to obtain a URL of the first network location.

3. The method of claim 1 further comprising:
based on results of the searching operation, retrieving a copy of the file from the first network location; and
storing the copy of the file in a cache accessible to the caching service.

4. The method of claim 1 further comprising:
if the cache contains a copy of the file, transmitting the copy of the file in response to receiving the request.

5. The method of claim 1 further comprising:
if the cache does not contain a copy of the file, generating a response to the request, the response containing an address of the first network location so that the requestor may obtain the file from the first network location; and
transmitting the response to a source of the request.

6. The method of claim 1 further comprising:
if the cache does not contain a copy of the file, retrieving a copy of the file from the first network location;

storing the copy of the file in a cache accessible to the caching service; and transmitting the copy of the file in response to receiving the request.

7. The method of claim 1 wherein the request addressed to the caching service was generated in response to a user selection of a hyperlink identifying the second network location as the location of the file.

8. The method of claim 1 wherein the request identifies the first network location to the caching service but not to the requester.

9. The method of claim 1 wherein the request includes a first URL of the first network location.

10. The method of claim 9 wherein the request is addressed to a second URL and wherein the second URL includes the first URL of the first network location.

11. The method of claim 1 further comprising:

recording information related to the request addressed to the caching service for the file.

12. The method of claim 11 further comprising:

billing a publisher associated with the file based on factors selected from a size of the file, a number of requests received by the caching service for the file at the first network location, and a number of advertisements transmitted to requestors of the file at the first network location by the caching service.

13. The method of claim 4 further comprising:

selecting content to be associated with the copy of the file; and transmitting the content to the requestor in addition to the copy of the file.

14. The method of claim 13 wherein the content includes an advertisement and the method further comprises:

billing an advertiser associated with the content based on factors selected from a number of advertisements transmitted to requesters of the file at the first network location by the caching service, a popularity of the file, a demographic of the requester, and a size of the file.

15. The method of claim 4 further comprising:

offering the requestor a choice of sources from which to obtain a copy of the file, the sources including the cache and a file distribution client application.

16. The method of claim 3 further comprising:

searching for payment information associated with the first network location, the payment information indicating how payments may be made to a publisher of the file at the first network location.

\* \* \* \* \*